Mar. 6, 1923.
A. R. POWELL ET AL.
DISPENSING APPARATUS.
FILED APR. 25, 1922.
1,447,321.
3 SHEETS—SHEET 1.
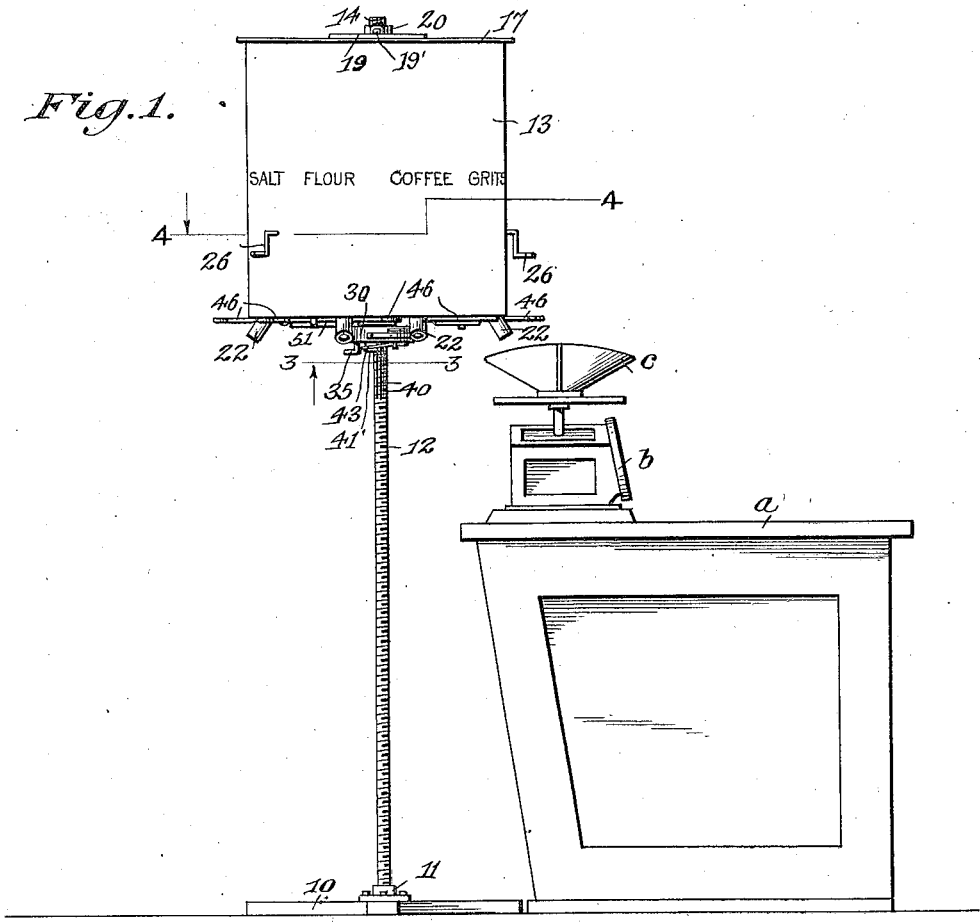
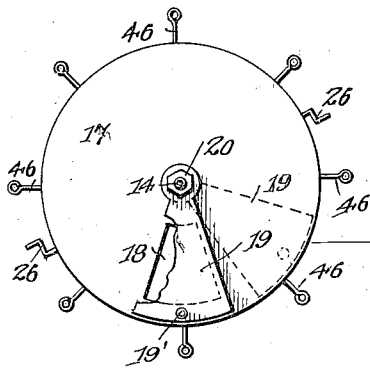
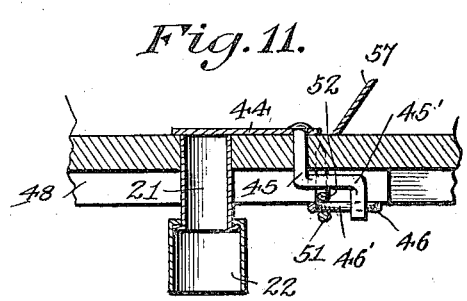
Alva R. Powell
Victor H. Futch, INVENTORS
BY Geo. P. Kimmel
ATTORNEY.

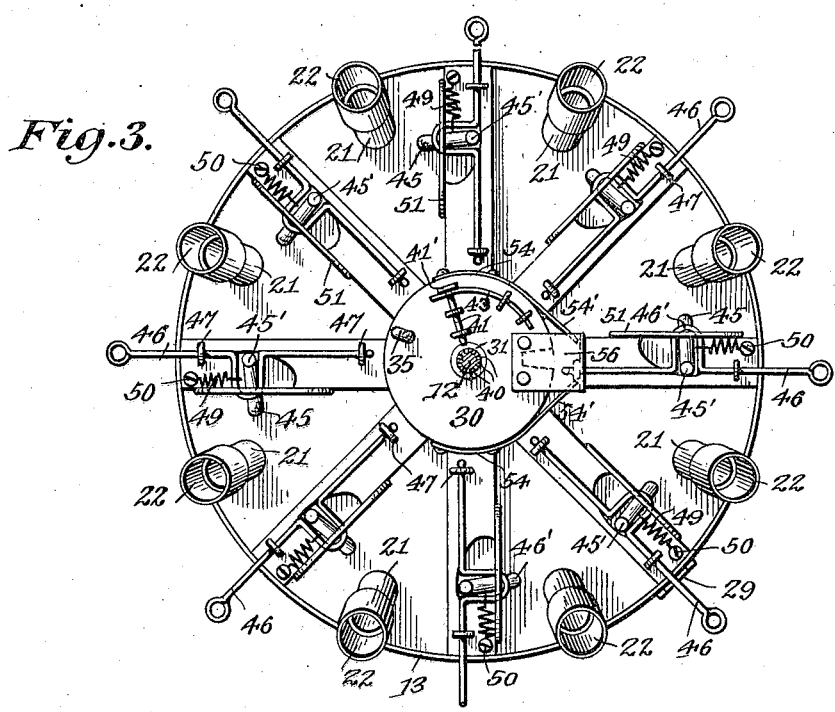
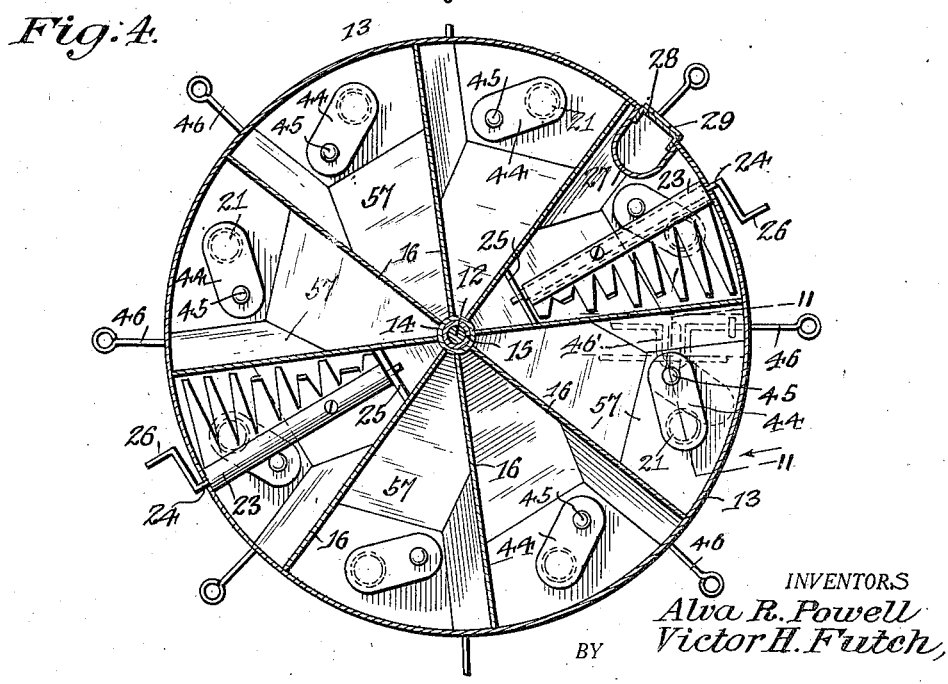

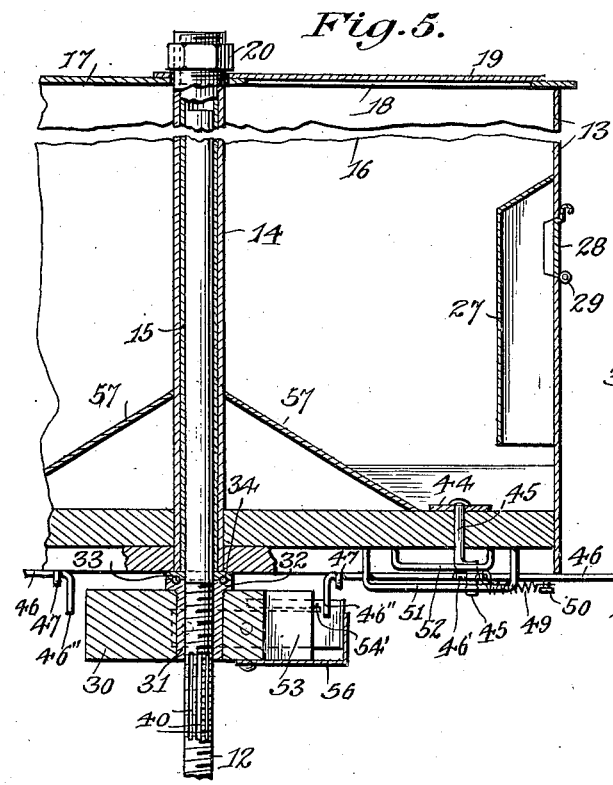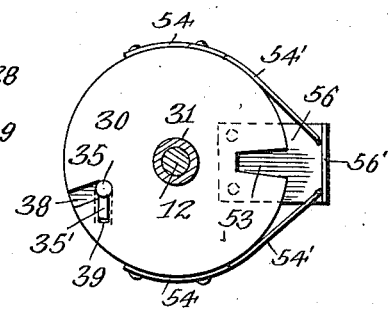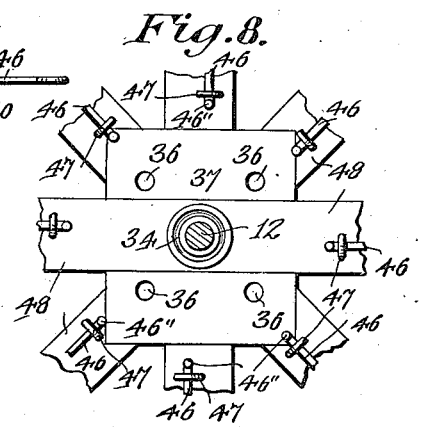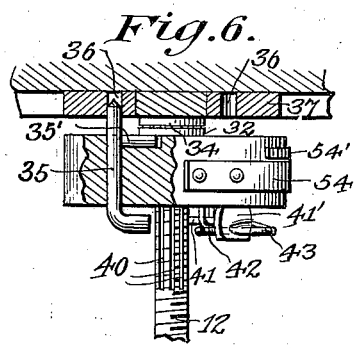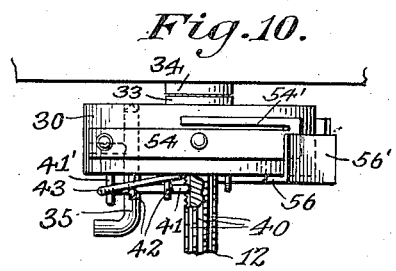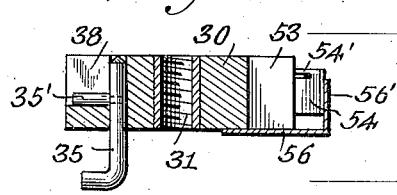

Patented Mar. 6, 1923.

1,447,321

UNITED STATES PATENT OFFICE.

ALVA R. POWELL AND VICTOR H. FUTCH, OF NASHVILLE, GEORGIA.

DISPENSING APPARATUS.

Application filed April 25, 1922. Serial No. 556,514.

*To all whom it may concern:*

Be it known that we, ALVA R. POWELL and VICTOR H. FUTCH, citizens of the United States, residing at Nashville, in the county of Berrien and State of Georgia, have invented certain new and useful Improvements in Dispensing Apparatus, of which the following is a specification.

This invention appertains to certain improvements in dispensing apparatus generally, and more particularly to a type of such apparatus adapted for holding and dispensing a plurality of different kinds of dry substances or commodities, whereby to facilitate the dispensing and weighing out of small quantities of such substances or commodities in grocery stores or the like, and to otherwise greatly decrease the labor ordinarily required in the usual methods now employed in such stores.

The principal object of the invention is to provide an apparatus of the class mentioned, involving a revolving cabinet having a plurality of compartments therein, and adapted to be positioned in proximity to a weighing scale, whereby portions of the contents from any one of the several compartments may be discharged directly into the scale pan, either before or after the scale has been set for the weighing out of a predetermined quantity thereof.

Another object of the invention is to provide an apparatus of the kind specified, wherein the cabinet is adjustable vertically of a support, whereby to be properly positioned with respect to a scale supported on a store counter or the like, and lowered from its raised position for facilitating the replenishing of the contents of the several compartments as required.

A further object of the invention is to provide an apparatus of the type mentioned, involving a novel form of means whereby to control the discharge of the contents from the several compartments of the dispensing cabinet, and a second means arranged to prevent the operation of the first mentioned means for the discharge of the contents from any one of the said compartments until after the cabinet has been revolved to bring the desired compartment into position with its discharge means over the scale pan.

Another and equally important object of the invention is to provide a dispensing apparatus as hereinbefore characterized, of a comparatively simple construction and arrangement, whereby to be easy to manipulate, durable and efficient in use and operation, and inexpensive to manufacture.

With the foregoing and other objects in view, the invention resides in the certain novel and useful construction and arrangement of parts as will be hereinafter more fully described, set forth in the appended claims, and illustrated in the accompanying drawing, in which:—

Figure 1 is an elevation of a preferred embodiment of the apparatus, and showing the contemplated manner of use of the same.

Fig. 2 is a top plan view thereof,

Fig. 3 is a horizontal section taken on the line 3—3 of Fig. 1 and looking in the direction of the arrows, Fig. 4 is another horizontal section taken on the line 4—4 of Fig. 1, Fig. 5 is an enlarged fragmentary vertical section through the upper part of the apparatus, Fig. 6 is an enlarged fragmentary sectional detail showing the means for effecting the raising and lowering movements of the cabinet on its standard.

Fig. 7 is a top plan view of the cabinet follower block or supporting disk,

Fig. 8 is an enlarged fragmentary detail of the locking block at the under side of the cabinet, Fig. 9 is an enlarged sectional detail of the locking device as carried by the follower block or cabinet supporting disk, Fig. 10 is an enlarged fragmentary detail of the locking device for retaining the follower block or disk in position on the standards for sustaining the cabinet in its raised and operative position, and, Fig. 11 is an enlarged sectional detail showing the construction and arrangement of one of the several discharge outlets of the cabinet and the control valve mechanism therefor.

Referring to the drawings, wherein similar characters of reference designate corresponding parts throughout the several views thereof, the preferred embodiment of the apparatus comprises a base 10, having a socket 11 disposed centrally thereof for the reception of the lower end of a screw threaded rod or shaft 12, constituting the supporting standard for a cabinet 13, the latter being preferably in the form of a cylindrical body or casing having a vertically disposed and concentrically arranged tubular center 14 therein provided with a bearing sleeve 15 surrounding the upper end portion of the standard 12, and through which the same passes in the raising and lowering movements of the cabinet body or casing 13 thereon.

The cylindrical cabinet body or casing 13 has its interior divided by a series of radially disposed partitions 16, preferably equidistantly spaced one from the other in a manner to provide a plurality of compartments of equal area or capacity to be filled with dry materials or substances, such as commodities usually sold in small quantities in grocery stores or the like. The upper end of the cabinet body or casing 13 is closed by means of a cover disk 17, which has a center opening fitted over the upwardly projected end of the tubular center 14, whereby to be rotated thereon in a manner to bring the filling opening 18, formed in the same, into registry with any one of the upper open ends of the compartments. This filling opening 18 is preferably of a configuration corresponding to the cross sectional area of a compartment, or slightly smaller than such area, and is normally closed by an auxiliary cover portion 19 of a similar configuration, also mounted on the projected portion of the tubular center 14. Relatively movement of the cover portions 17 and 19 is normally prevented by a lock nut 20 threaded onto the projected portion of the tubular center 14, and this nut 20 is loosened up on the latter whenever it is desired to manipulate the said cover portions. Opening outwardly of the bottom wall of each of the compartments of the cabinet 10, at points immediately inward of the front walls thereof, are discharge openings having depending therefrom rigid and outwardly inclined spout sections 21, which are preferably provided with extended portions 22, whereby to direct the material outwardly beyond the wall of the cabinet 10. One or more of the compartments, especially those of the same which are filled with substances or materials such as sugar or the like, and which tend to harden or lump upon changes in atmospheric conditions or from any other cause, are provided with agitator elements 23, which are suitably fastened on horizontally disposed shafts 24 journaled at their outer ends in the front walls of the compartments and at their inner ends in bearing brackets 25 secured in position between adjacent partition walls 16, substantially as shown in Fig. 4. The outer ends of said shafts 24 are bent or otherwise formed to provide cranked portions 26 suitable to be grasped by the operator for imparting an oscillatory movement to the agitators 23. Also, in certain of the compartments, it is desirable to place a vertically disposed casing 27 closed at its upper end and open at its lower end, so that the substance or material filling the particular compartment will also fill the casing 27, whereby small quantities of the substance or material may be scooped outwardly therefrom through an opening formed in the front wall of the casing for the accurate weighing out of the desired quantity, after the bulk of the same has been discharged in the ordinary manner outwardly of the discharge spout sections 21 and 22. This opening, giving access to the interior of the casing 27, is provided with an outwardly swinging closure 28, which is hinged as at 29 to the lower edge thereof for the purpose.

Mounted on the standard 12 is a circular member or block 30, which acts as a support proper for the cabinet body or casing 10 at any desired heighth on the standard, and this block is provided with a centrally disposed sleeve 31 arranged for threaded engagement with the lower threaded portion of the standard 12. The upper end of this sleeve 31 is flanged as at 32, to provide a raceway for the reception of a series of ball bearings 33 interposed between the same and the upper raceway member 34 on which is directly supported the cabinet body or casing 13. To effect the raising and lowering movements of the cabinet body or casing 13, the same is to be coupled to the supporting block or disk 30 by means of a locking pin 35 movable vertically of the latter for the purpose, and in a manner to have its upper end engage in any one of a set of openings 36 formed in a keeper block 37 secured on the under side of the bottom wall of the cabinet. The lock pin 35 is loosely mounted in a vertically disposed opening in the supporting disk or block 30, and is provided with an angularly offset portion 35', inwardly of its upper end, which is engageable in a peripherally formed slotted recess 38, whereby to allow the pin 35 to drop to its lowest position, for the uncoupling of the cabinet body or casing 13 therefrom, and also in a slotted recess 39 formed in the upper face of the block or disk 30 for the retention of the pin 35 in its raised and operative position.

Formed in the upper threaded portion of the standard 12, are a plurality of longitudinally arranged and equidistantly disposed slots 40, which are to be engaged by a detent 41 carried by the block or disk 30, whereby the latter is to be held against rotation in its uppermost position of supporting the cabinet body or casing 13 at a height sufficiently to allow one side of the same to overlie the pan $c$ of a scale $b$ placed on a sales counter $a$. This detent is slidably mounted in a series of radially alined brackets 42 carried at the under side of the supporting block or disk 30, and cooperative with the same is a spring member 43, which is curved correspondingly to and disposed slightly inward of the peripheral edge of the said block or disk 30.

The detent 41 is headed as at 41', and when in its operative engagement with one of the slots 40, the free end portion of the spring 43 is disposed against the outer face of the headed portion 41' and acts thereon to retain the pin in such position, while this end of the spring 43 is removed from its engagement with the outer face of the head 41' and is engaged in rear thereof whereby to act to withdraw the detent 41 from its engagement with a slot 40 and to otherwise retain the same out of such engagement during the raising and lowering movements of the cabinet body or casing 13.

The discharge outlets 21 of each of the compartments of the cabinet body or casing 13, is controlled by a valve member 44, which is secured on the inner end of an operating rod or shaft 45 projecting upwardly through the bottom wall of the cabinet. The lower or outer ends of the shafts 45 are each formed to provide a crank portion 45', which is engaged in an angularly offset looped portion 46' formed medially of the inner and outer ends of the operating rods 46. These operating rods 46 are mounted in brackets 47 secured in alinement on strips 48 disposed radially of the under side of the bottom wall of the cabinet body or casing 13. These rods 46 are normally held in outwardly disposed positions, with the valves 44 controlled thereby closed, by means of coiled springs 49, which are attached at their outer ends to screws 50 and at their inner ends directly to the looped portions 46' of the rods 46. The looped portions 46' are maintained in their engagement with the cranked portions 45', of the operating rods, by means of pairs of guide rods 51 and 52 extending in parallel relation to the operating rods 46, the guide rod 51 underlying and the guide rod 52 overlying the free end portions of the looped portions of the operating rods for the purpose.

In the operation of the apparatus, it is desirable to prevent the manipulation of any of the valves 44 for the discharge of the contents of any one of the several compartments of the cabinet body or casing 13, until the discharge spout 22 of a selected compartment is positioned directly over the scale pan c, and for this purpose, the inner ends of the valve operating rods 46 are angularly bent in a downward direction, as at 46", whereby these bent portions 46" strike the peripheral wall of the supporting block or disk 30 when an attempt is made to manipulate any one of the several rods 46 not in proper position to effect the discharge of the contents from a particular department into the scale pan c. However, to admit of the proper operation of the desired valve rod, the supporting block or disk 30 is provided with a radially elongated slotted recess 53 opening through its peripheral wall, and the block or disk 30 is to be locked in its upper cabinet supporting position by means of the detent 41 being engaged in one of the slotways 40 of the standard 12, when the slotway 53 is positioned directly over the scale pan c. Associated with the slotway 53, of the block or disk 30, is a tell-tale device consisting of a pair of oppositely disposed spring members 54, which are secured in position on the peripheral edge of the block or disk 30 at the opposite sides of the slotted recess 53, with their free ends spaced slightly apart directly in line with the latter, in which position, these free ends are maintained by means of a metal plate 56 secured on the under side of the block or disk 30 and projecting outwardly therefrom, the free end of the plate 56 being upturned and contacted by the outer free ends of the springs 54, substantially as is shown in Fig. 7. The upper free edges of the springs 54 are split to provide offset finger portions 54', which allow for the angular ends 46" of the valve operating rods 46 to ride up the same in the turning movements of the cabinet body or casing 13 freely on the supporting block or disk 30, now being held stationary, and place the same under compression until the ends 46" of the operating rods reach the space between the opposed ends of the springs 54, when the one just under compression will snap outwardly against the angularly upturned portion 56' of the plate 56, so that the resultant click of the metal of the spring against that of the portion 56' will indicate that the particular valve rod, causing the operation of the spring, is now in position to be actuated. By now pushing inward on the operating rod 46, the angular inner end 46" thereof will enter the recess 53, and the looped portion thereof will actuate the crank shaft 45 for the opening of the valve 44 in the particular compartment selected for the discharge of the contents therefrom. In the event of one or more of the compartments of the cabinet body or casing 13 becoming empty, or otherwise needing to be refilled, instead of attempting to accomplish this while the cabinet is in its raised position, the operator will change the position of the spring 43 from its position against the outer head portion of the detent 41 to a position in rear thereof so that the latter is uncoupled from engagement with the groove of the standard 12, and will then manipulate to lock pin 35 upwardly of the supporting block or disk 30 for the coupling of the same with the apertured keeper block 37 on the under side of the cabinet 13. Now, by rotating the cabinet in an anti-clockwise direction, the same, together with the block or disk 30, will lower to a desired position for the easy filling of the compartments.

To facilitate the discharge of the contents from each of the compartments of the cabinet body or casing 13, suitable angularly arranged and inclined deflecting walls 57 are provided in the bottom of each compartment to direct the substances or materials to the discharge outlets 21, the lower edges of the walls 57 being disposed so as to allow for the free and unobstructed swinging movements of the cutoffs or valves 44, substantially as shown.

From the foregoing, it will be readily apparent that, while a preferred embodiment of the apparatus has been described and illustrated herein in specific terms and details of construction and arrangement, various changes in and modifications of the same may be resorted to without departing from the spirit of the invention, or the scope of the claims appended hereto.

Having thus described the invention, what is claimed as new, is:—

1. In a dispensing apparatus, a standard, a rotatable cabinet adapted for lowering and raising movements on said standard to and from normal position of use and having a plurality of compartments therein, discharging means at the bottom of each of said compartments, means for effecting the actuation of said discharging means one independently of the other, and means for preventing the actuation of said controlling means except when said cabinet has been rotated to bring a selected compartment to a predetermined position of discharge.

2. In a dispensing apparatus, a standard, a rotatable cabinet mounted on said standard and having a plurality of compartments therein, a rotatable member on said standard and supporting said cabinet in position, means for coupling said supporting member to said cabinet whereby to effect simultaneous lowering and raising movements thereof to and from the normal position of use of the same, means for securing said supporting member against rotation in its upper position on said standard and for the free rotation of said cabinet thereon, discharging means in the bottom of each of said compartments, means for effecting the actuation of said discharging means one independently of the other, and means for preventing the actuation of said controlling means except when said cabinet has been rotated to bring a selected compartment to a predetermined position of discharge.

3. In a dispensing apparatus, a base, a standard rising from said base and screw-threaded for a major portion of its lower length, a cabinet mounted for free rotation on said standard and having a plurality of compartments therein, a member for supporting said cabinet mounted on said standard and arranged in screw-threaded engagement with the threaded portion thereof, means for coupling said supporting member to said cabinet whereby to effect the simultaneous lowering and raising movements thereof to and from the normal position of use of the same, means for securing said supporting member against rotation in its upper position on said standard and for the free rotation of said cabinet thereon, discharging means in the bottom of each of said compartments, means for effecting the actuation of said discharging means one independently of the other, and means for preventing the actuation of said controlling means except when said cabinet has been rotated to bring a selected compartment to a predetermined position of discharge.

In testimony whereof, we affix our signatures hereto.

ALVA R. POWELL.
VICTOR H. FUTCH.